United States Patent
McBride et al.

(10) Patent No.: US 11,507,349 B2
(45) Date of Patent: Nov. 22, 2022

(54) NEURAL PROCESSING ELEMENT WITH SINGLE INSTRUCTION MULTIPLE DATA (SIMD) COMPUTE LANES

(71) Applicant: MICROSOFT TECHNOLOGY LICENSING, LLC, Redmond, WA (US)

(72) Inventors: Chad Balling McBride, North Bend, WA (US); Amol A. Ambardekar, Redmond, WA (US); Boris Bobrov, Kirkland, WA (US); Kent D. Cedola, Belevue, WA (US); George Petre, Redmond, WA (US); Larry Marvin Wall, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 16/454,047

(22) Filed: Jun. 26, 2019

(65) Prior Publication Data

US 2020/0409663 A1    Dec. 31, 2020

(51) Int. Cl.
*G06F 7/544* (2006.01)
*G06F 7/48* (2006.01)
*G06N 3/063* (2006.01)

(52) U.S. Cl.
CPC .......... *G06F 7/5443* (2013.01); *G06F 7/4824* (2013.01); *G06N 3/063* (2013.01)

(58) Field of Classification Search
CPC ............................. G06F 7/5443; G06N 3/063
See application file for complete search history.

(56) References Cited

U.S. PATENT DOCUMENTS

| 4,994,982 A | 2/1991 | Duranton et al. |
| 5,146,543 A | 9/1992 | Vassiliadis et al. |
| 5,337,395 A | 8/1994 | Vassiliadis et al. |
| 5,974,435 A * | 10/1999 | Abbott ................. G06F 7/5324 708/523 |
| 2017/0316308 A1 | 11/2017 | Srivastava et al. |

(Continued)

FOREIGN PATENT DOCUMENTS

CN    106940815 A    7/2017

OTHER PUBLICATIONS

Albericio, et al., "Cnvlutin: Ineffectual-Neuron-Free Deep Neural Network Computing", In Proceedings of the 43rd International Symposium on Computer Architecture, Jun. 18, 2016, 13 Pages.

(Continued)

*Primary Examiner* — Michael D. Yaary
(74) *Attorney, Agent, or Firm* — Newport IP, LLC; Han K. Gim (57) ABSTRACT

An architecture is disclosed for an neural processing element having single instruction, multiple data ("SIMD") compute lanes. The neural processing element includes compute lanes having multipliers configured to multiply a binary operand with another binary operand to generate a binary output. The neural processing element also includes a single adder tree for summing the binary outputs of the hardware binary multipliers. The neural processing element also includes a storage element for storing a binary output of the single hardware binary adder tree.

20 Claims, 5 Drawing Sheets

(56) References Cited

U.S. PATENT DOCUMENTS

| | | | |
|---|---|---|---|
| 2017/0357891 A1* | 12/2017 | Judd | G06N 3/063 |
| 2018/0121796 A1* | 5/2018 | Deisher | G06N 3/063 |
| 2018/0164866 A1 | 6/2018 | Turakhia et al. | |
| 2018/0314671 A1 | 11/2018 | Zhang et al. | |
| 2018/0315157 A1* | 11/2018 | Ould-Ahmed-Vall | G06N 20/00 |
| 2018/0322390 A1* | 11/2018 | Das | G06F 9/30192 |
| 2019/0138567 A1 | 5/2019 | Martin et al. | |
| 2019/0147327 A1* | 5/2019 | Martin | G06F 17/15 706/15 |

OTHER PUBLICATIONS

Huan, et al., "A Low-Power Accelerator for Deep Neural Networks with Enlarged Near-Zero Sparsity", In Journal of Computing Research Repository, May 2017, 5 Pages.

Prost-Boucle, et al., "High-Efficiency Convolutional Ternary Neural Networks with Custom Adder Trees and Weight Compression", In Journal of ACM Transactions on Reconfigurable Technology and Systems, vol. 11, Issue 3, Dec. 2018, 24 Pages.

"International Search Report and Written Opinion Issued in PCT Application No. PCT/US2020/031972", dated Aug. 10, 2020, 12 Pages.

Sanaullah, et al., "Real-Time Data Analysis for Medical Diagnosis using FPGA-Accelerated Neural Networks", In BMC Bioinformatics, vol. 19, Issue 18, Dec. 21, 2018, pp. 19-31.

* cited by examiner

NEURAL PROCESSING ELEMENT WITH SINGLE INSTRUCTION MULTIPLE DATA (SIMD) COMPUTE LANES

BACKGROUND

Deep neural networks ("DNNs") are loosely modeled after information processing and communication patterns in biological nervous systems, such as the human brain. DNNs can be utilized to solve complex classification problems such as, but not limited to, object detection, semantic labeling, and feature extraction. As a result, DNNs form the foundation for many artificial intelligence ("AI") applications, such as computer vision, speech recognition, and machine translation. DNNs can match or exceed human accuracy in many of these domains.

The high-level of performance of DNNs stems from their ability to extract high-level features from input data after using statistical learning over a large data set to obtain an effective representation of an input space. However, the superior performance of DNNs comes at the cost of high computational complexity. High performance general-purpose processors, such as graphics processing units ("GPUs"), are commonly utilized to provide the high level of computational performance required by many DNN applications.

While general-purpose processors, like GPUs, can provide a high level of computational performance for implementing DNNs, these types of processors are typically unsuitable for use in performing DNN operations over long durations in computing devices where low power consumption is critical. For example, general-purpose processors, such as GPUs, can be unsuitable for use in performing long-running DNN tasks in battery-powered portable devices, like smartphones or alternate/virtual reality ("AR/VR") devices, where the reduced power consumption is required to extend battery life.

Reduced power consumption while performing continuous DNN tasks, such as detection of human movement, can also be important in non-battery-powered devices, such as a power-over-Ethernet ("POE") security camera for example. In this specific example, POE switches can provide only a limited amount of power; reducing the power consumption of POE devices like security cameras permits the use of POE switches that provide less power.

Application-specific integrated circuits ("ASICs") have been developed that can provide performant DNN processing while at the same time reducing power consumption as compared to general-purpose processors. Despite advances in this area, however, there is a continued need to improve the performance and reduce the power consumption of ASICs that perform DNN processing, particularly for use in computing devices where the low power consumption is critical.

It is with respect to these and other technical challenges that the disclosure made herein is presented.

SUMMARY

An neural processing element with single instruction, multiple data ("SIMD") compute lanes is disclosed herein. The architecture of the neural processing element disclosed herein reduces the number of accumulator bits per multiplier in the neuron as compared to previous solutions. Reducing the number of accumulator bits in this manner can reduce the amount of power consumed by the neural processing element as also compared to previous implementations. Other technical benefits not specifically mentioned herein can also be realized through implementations of the disclosed subject matter.

In order to realize the technical benefits mentioned briefly above, a DNN processor is disclosed that includes neural processing elements. The neural processing elements include, among other things, hardware binary multipliers (which might be referred to herein as "multipliers"). The hardware binary multipliers are configured to multiply a binary operand with another binary operand to generate a binary output. In one particular configuration, the operands are signed 8-bit binary numbers (i.e. 9-bit binary numbers). In this configuration, the output of the hardware binary multipliers is an 18-bit binary number. The operands can be powers of two plus one bit (i.e. $(N^2)+1$)).

The neural processing elements also include a single hardware binary adder tree (which might be referred to herein as an "adder tree") for summing the binary outputs of the hardware binary multipliers. In one particular implementation, the hardware binary adder tree includes an even number of hardware binary adders (which might be referred to herein as "first hardware binary adders") for summing the binary outputs of the hardware binary multipliers. The hardware binary adders are configured to output 19-bit binary numbers in one particular configuration.

The single hardware binary adder tree can also include an even number of additional hardware binary adders (which might be referred to herein as "second hardware binary adders") for summing outputs of the hardware binary adders described above. The outputs of these hardware binary adders are 20-bit binary numbers in one configuration but can include a different number of bits in other configurations.

In some configurations, the single hardware binary adder tree includes another hardware binary adder (which might be referred to herein as a "third hardware binary adder") for summing outputs of the second hardware binary adders described above. In one particular configuration, the output of the third hardware binary adder is a 21-bit binary number. Other numbers of binary adders having different bit widths can be utilized in other configurations.

In one configuration, the neural processing elements also include a storage element (e.g. a flip flop, SRAM, DRAM, etc.) for storing the binary output of the single hardware binary adder tree. The binary output of the single hardware binary adder tree is a 21-bit binary number in some configurations. Other bit widths can be utilized in other configurations.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to an neural processing element with SIMD compute lanes. As discussed briefly above, implementations of the disclosed technologies can conserve power as compared to previous neural processing element implementations. Other technical benefits not specifically mentioned herein can also be realized through implementations of the disclosed subject matter.

While the subject matter described herein is presented in the general context of hardware neural processing elements implemented in conjunction with a hardware DNN processor, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of an neural processing element with SIMD compute lanes will be described.

Figure 1:
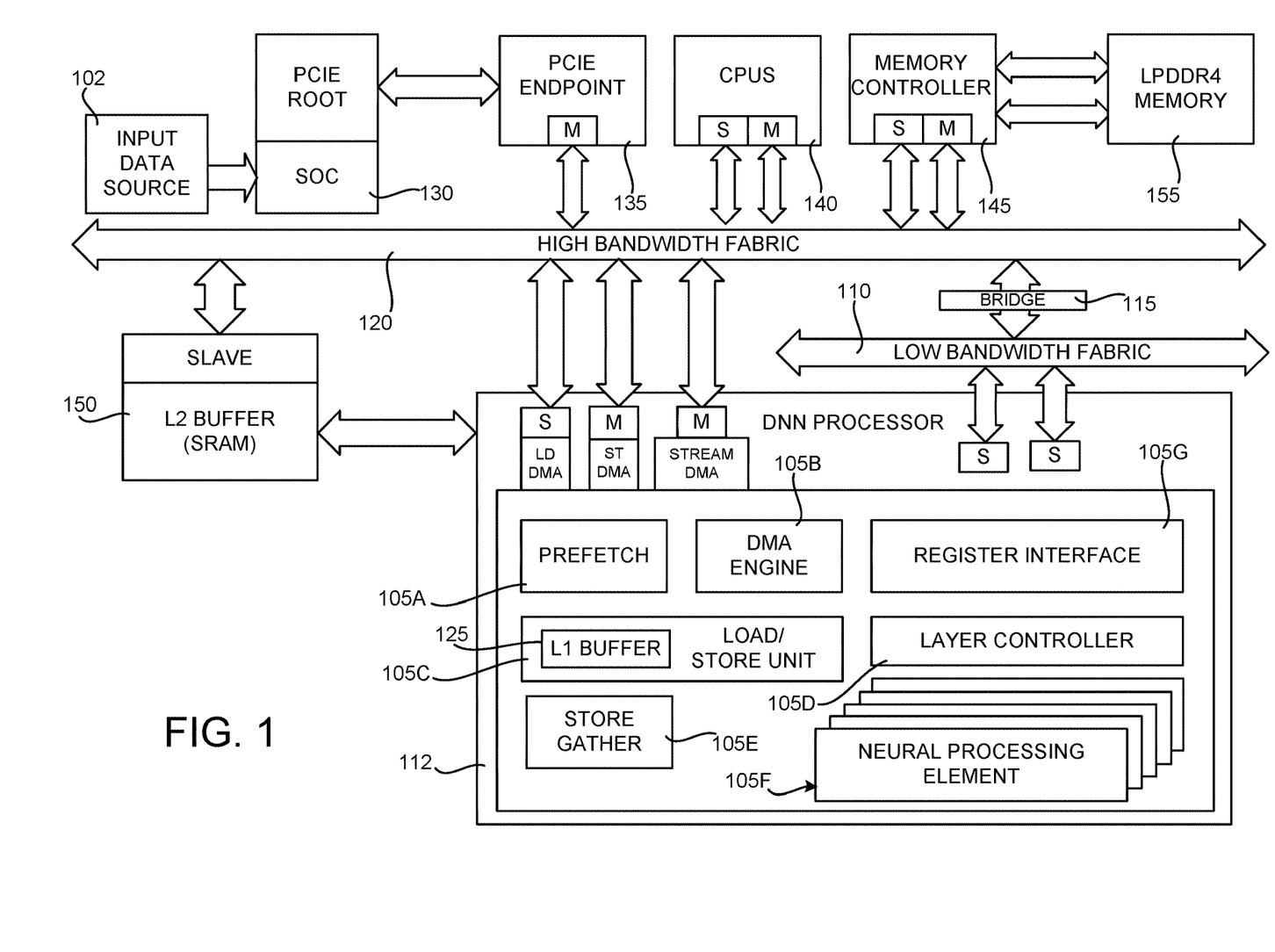
FIG. 1 is a computing architecture diagram that shows aspects of the configuration and operation of a processing system that includes a DNN processor that implements aspects of the technologies disclosed herein, according to one embodiment.

FIG. 1 is a computing architecture diagram that shows aspects of the configuration and operation of a processing system that implements the technologies disclosed herein, according to one embodiment. The processing system disclosed herein is configured in some embodiments to solve classification problems (and related problems) such as, but not limited to, eye tracking, hand tracking, object detection, semantic labeling, and feature extraction.

In order to provide this functionality, a DNN processor 112 is provided that can implement a recall-only neural network and programmatically support a wide variety of network structures. Training for the network implemented by the DNN processor 112 can be performed offline in a server farm, data center, or another suitable computing environment. The result of training a DNN is a set of parameters that can be known as "weights" or "kernels."

These parameters represent a transform function that can be applied to an input with the result being a classification or semantically labeled output.

The DNN processor 112 disclosed herein can be considered a superscalar processor. The DNN processor 112 can dispatch one or more instructions to multiple execution units, called neural processing elements 105F. The execution units can be "simultaneous dispatch simultaneous complete," where each execution unit is synchronized with each of the other execution units. The DNN processor 112 can be classified as a single instruction stream, multiple data stream ("SIMD") architecture.

A neural processing element 105F is the base unit in artificial neural networks that is used to model a biological neuron in the brain. The model of a neural processing element 105F can include the inner product of an input vector with a weight vector added to a bias, with an activation function applied.

Each neural processing element 105F in the DNN processor 112 is capable of performing weighted sum, max pooling, bypass, and potentially other types of operations. The neural processing elements 105F process input and weight data every clock cycle. Each neural processing element 105F is synchronized to all other neural processing elements 105F in terms of progress within a kernel to minimize the flow of kernel data within the DNN processor 112.

Each neural processing element 105F can contain a multiplier, an adder, a comparator, and a number of accumulators (not shown in FIG. 1). By having multiple accumulators, the neural processing elements 105F are able to maintain context for multiple different active kernels at a time. Each accumulator is capable of being loaded from a read of the SRAM 150 (described below). The accumulators can sum themselves with the contents of other accumulators from other neural processing elements 105F.

The DNN processor 112 accepts planar data as input, such as image data. Input to the DNN processor 112 is not, however, limited to image data. Rather, the DNN processor 112 can operate on any input data presented to the DNN processor 112 in a uniform planar format. In one particular embodiment, the DNN processor 112 can accept as input multi-planar one-byte or two-byte data frames.

Each input frame can be convolved with an N×K×H×W set of kernels, where N is the number of kernels, K is the number of channels per kernel, H is the height, and W is the width. Convolution is performed on overlapping intervals across the input data where the interval is defined by strides in the X and Y directions. These functions are performed by the neural processing elements 105F and managed by the DNN processor 112 and software-visible control registers. Other types of operations might also be performed including, but not limited to, fully connected, batch normalization, and other types of operations.

The DNN processor 112 supports multiple data types: weights; input data/feature maps; activation data; biases; and scalars. Input data/feature maps and activation data are, in most cases, two names for the same data with the distinction that when referring to an output of a layer the term activation data is used. When referring to the input of a layer the term input data/feature map is used.

The neural processing elements 105F in the DNN processor 112 compute a weighted sum of their inputs and pass the weighted sum through an "activation function" or "transfer function." The transfer function commonly has a sigmoid shape but might also take on the form of a piecewise linear function, step function, or another type of function. The activation function allows the neural processing elements 105F to train to a larger set of inputs and desired outputs where classification boundaries are non-linear.

The DNN processor 112 operates on a list of layer descriptors which correspond to the layers of a neural network. The list of layer descriptors can be treated by the DNN processor 112 as instructions. These descriptors can be pre-fetched from memory into the DNN processor 112 and executed in order. The descriptor list acts as a set of instructions to the DNN processor 112. In some configurations, two types of instructions are utilized: layer descriptors; and program instructions that get executed on a sequence controller. Software tools and/or compilers can be executed on devices external to the DNN processor 112 to create the descriptor lists that are executed on the DNN processor 112.

Generally, there can be two main classes of descriptors: memory-to-memory move ("M2M") descriptors; and operation descriptors. M2M descriptors can be used to move data to/from the main memory to/from a local buffer (i.e. the buffer 125 described below) for consumption by the operation descriptors. M2M descriptors follow a different execution pipeline than the operation descriptors. The target pipeline for M2M descriptors can be the internal DMA engine 105B or the configuration registers 105G, whereas the target pipeline for the operation descriptors can be the neural processing elements 105F.

Operational descriptors specify a specific operation that the neural processing elements 105F should perform on a data structure located in local static random-access memory ("SRAM") memory. The operational descriptors are processed in order and are capable of many different layer operations, at least some of which are described herein.

As illustrated in FIG. 1, the DNN processor 112 has a memory subsystem with a unique L1 and L2 buffer structure. The L1 and L2 buffers shown in FIG. 1 are designed specifically for neural network processing. By way of example, the L2 buffer 150 can maintain a selected storage capacity with a high speed private interface operating at a selected frequency. The L1 buffer 125 can maintain a selected storage capacity that can be split between kernel and activation data. The L1 buffer 125 might be referred to herein as the "buffer 125," and the L2 buffer 150 might be referred to herein as the SRAM 150.

Computational data (i.e. inputs data, weights and activation data) is stored in the SRAM 150 row-major in some embodiments. The computational data can be organized as two buffers, where one buffer contains input data, which might be referred to herein as the "input buffer," and the other buffer, which might be referred to herein as the "weight buffer," contains kernel weights. The buffers are filled from the SRAM 150 by the load/store unit 105C. Data is accumulated in each buffer until it has reached its predetermined capacity. The buffer data is then copied to a shadow buffer in some embodiments and presented to the neural processing elements 105F.

The DNN processor 112 can also comprise a number of other components including, but not limited to, a register interface 105G, a prefetch unit 105A, a store/gather unit 105E, a layer controller 105D, and a register interface 105G. The DNN processor 112 can include additional or alternate components in some embodiments.

The DNN processor 112 operates in conjunction with other external computing components in some configurations. For example, the DNN processor 112 is connected to a host application processor system on chip ("the host SoC") 130 in some embodiments. The DNN processor 112 can be connected to the host SoC 130 through a PCIe interface, for example. Appropriate PCIe components, such as the PCIe endpoint 135 can be utilized to enable these connections.

The Host SoC 130 serves as the application processor for the DNN processor 112. The main operating system, application, and auxiliary sensor processing are performed by the host SoC 130. The host SoC 130 can also be connected to an input data source 102, such as an external camera, that provides input data, such as image data, to the DNN processor 112. Additional central processing units ("CPUs" or "processors"), such as TENSILICA nodes 140, can also be utilized to coordinate the operation of the DNN processor 112, aspects of which will be described below.

DDR DRAM 155 can also be connected to the host SoC 130 that can be used as the main system memory. This memory is accessible from the host SoC 130 across the high bandwidth fabric 120 (e.g. PCIe bus) by way of a memory controller 145. The high bandwidth fabric 120 provides bidirectional direct memory access ("DMA") small messaging transactions and larger DMA transactions. A bridge 115 and low bandwidth fabric 110 can connect the DNN processor 112 to the host SoC 130 for sub-module configuration and other functions.

The DNN processor 112 can include a DMA engine 105B that is configured to move data to and from main memory 155. The DMA engine 105B has two channels in some embodiments. One channel is dedicated to fetching operation descriptors while the other channel is dedicated to M2M operations. A DMA descriptor can be embedded in the M2M descriptor. Descriptors in this context are DMA descriptors that are used to move the contents of memory, not to be confused with the operation descriptors described above.

To offload the local SRAM memory 150, and to provide more space for input data and weight data, the activation output can optionally be streamed directly to DDR memory 155. When streaming data to DDR memory 155, the DNN processor 112 will accumulate enough data for a burst transaction on the high bandwidth fabric 120 and will buffer enough transactions to minimize backpressure on the neural processing elements 105F. Additional details regarding the operation of the DNN processor 112 will be provided below. In particular, details regarding the configuration and operation of an neural processing element 105F with SIMD compute lanes will be provided below with regard to FIGS. 2 and 3.

Figure 2:
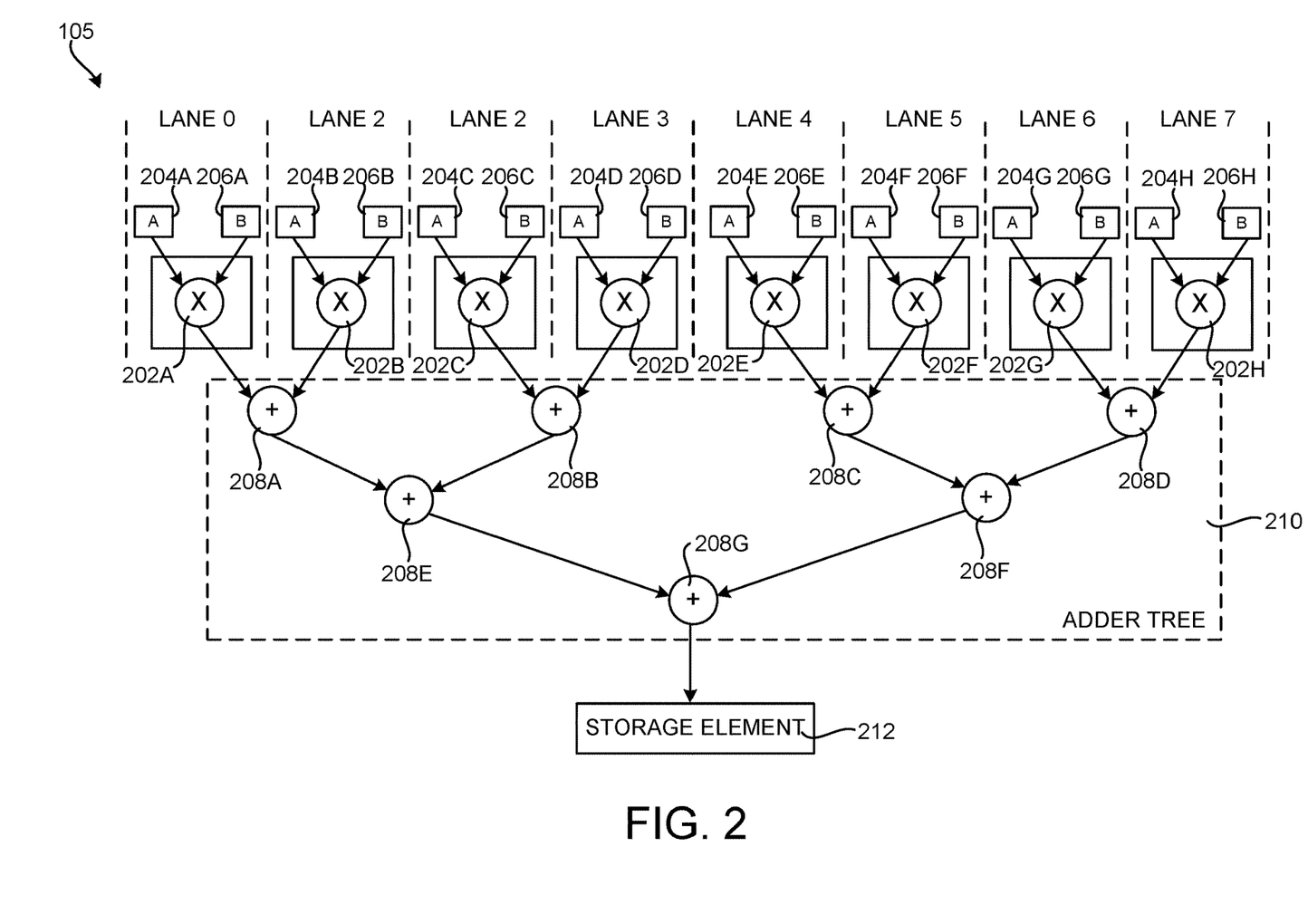
FIG. 2 is a computing architecture diagram showing aspects of the configuration of an neural processing element with SIMD compute lanes, according to one embodiment.

FIG. 2 is a computing architecture diagram showing aspects of the configuration and operation of an neural processing element 105F having SIMD compute lanes. As shown in FIG. 2, the neural processing elements 105F of the DNN processor 112 can include, among other things, hardware binary multipliers 204 (which might be referred to herein as "multipliers") arranged into compute lanes (e.g. lane 0 to lane 7 in the illustrated example). The number of compute lanes present is computed as a power of two.

The hardware binary multipliers 204 are configured to multiply a binary operand 204 with another binary operand 206 to generate a binary output. The operands 204 and 206 might, for example, be inputs data, weights, activation data, or another type of data. In one particular configuration, the operands 204 and 206 are signed 8-bit binary numbers (i.e. 9-bit binary numbers). In this configuration, the output of the hardware binary multipliers 202 is an 18-bit binary number. The operands can be powers of two plus one bit (i.e. $(N^2)+1$)) in other configurations.

In one particular configuration, the neural processing element 105F includes eight hardware binary multipliers 202A-202H. In this configuration, the hardware binary multiplier 202A is configured to multiply the operands 204A and 206A, the hardware binary multiplier 202B is configured to multiply the operands 204B and 206B, the hardware binary multiplier 202C is configured to multiply the operands 204C and 206C, the hardware binary multiplier 202D is configured to multiply the operands 204D and 206D, the hardware binary multiplier 202E is configured to multiply the operands 204E and 206E, the hardware binary multiplier 202F is configured to multiply the operands 204F and 206F, and the hardware binary multiplier 202G is configured to multiply the operands 204G and 206G. Other numbers of multipliers 202 can be utilized in other configurations.

As shown in FIG. 2, the neural processing elements 105F 105 also include a single hardware binary adder tree 210 (which might be referred to herein as an "adder tree") for summing the binary outputs of the hardware binary multipliers 202. In one particular implementation, the adder tree 210 includes an even number (four in the illustrated example) of hardware binary adders 208A-208D (which might be referred to herein as "first hardware binary adders") for summing the binary outputs of the hardware binary multipliers 202. The hardware binary adders 208A-208D are configured to output 19-bit binary numbers in one particular configuration. In this regard, it is to be appreciated that the output might be a different number of bits in other configurations and that the number of levels in the adder tree 210 is determined by the number of compute lanes.

In the illustrated configuration, the adder tree 210 includes four first hardware binary adders 208A-208D. In particular, the hardware adder tree 210 includes a hardware binary adder 208A that adds the binary outputs of the hardware binary multiplier 202A and the hardware binary multiplier 202B, a hardware binary adder 208B that adds the binary outputs of the hardware binary multiplier 202C and the hardware binary multiplier 202D, a hardware binary adder 208C that adds the binary outputs of the hardware binary multiplier 202E and the hardware binary multiplier 202F, and a hardware binary adder 208D that adds the binary outputs of the hardware binary multiplier 202G and the hardware binary multiplier 202H.

The adder tree 210 can also include an even number (two in the illustrated example) of additional hardware binary adders 208E and 208F (which might be referred to herein as "second hardware binary adders") for summing outputs of the hardware binary adders 208A-208D, described above. The outputs of these hardware binary adders 208E and 208F are 20-bit binary numbers in one configuration.

In some configurations, the adder tree 210 includes a single hardware binary adder 208G (which might be referred to herein as a "third hardware binary adder") for summing outputs of the second hardware binary adders 208E and 20F described above. In one particular configuration, the output of the third hardware binary adder 208G is a 21-bit binary number. Other numbers of binary adders 208 having different bit widths can be utilized in other configurations. In this regard, it is to be appreciated that the number of binary adders 208 in the adder tree 210 will vary based upon the number of multipliers 202 in the neural processing element 105F.

In one configuration, the neural processing elements 105F 105 also include a storage element 212 (e.g. flip flop, SRAM, DRAM, etc.) for storing a binary output of the adder tree 210 (i.e. the output of the adder 208G in the illustrated configuration). The binary output of the adder tree 210 is a 21-bit binary number in some configurations. Other bit widths can be utilized in other configurations.

Figure 3:
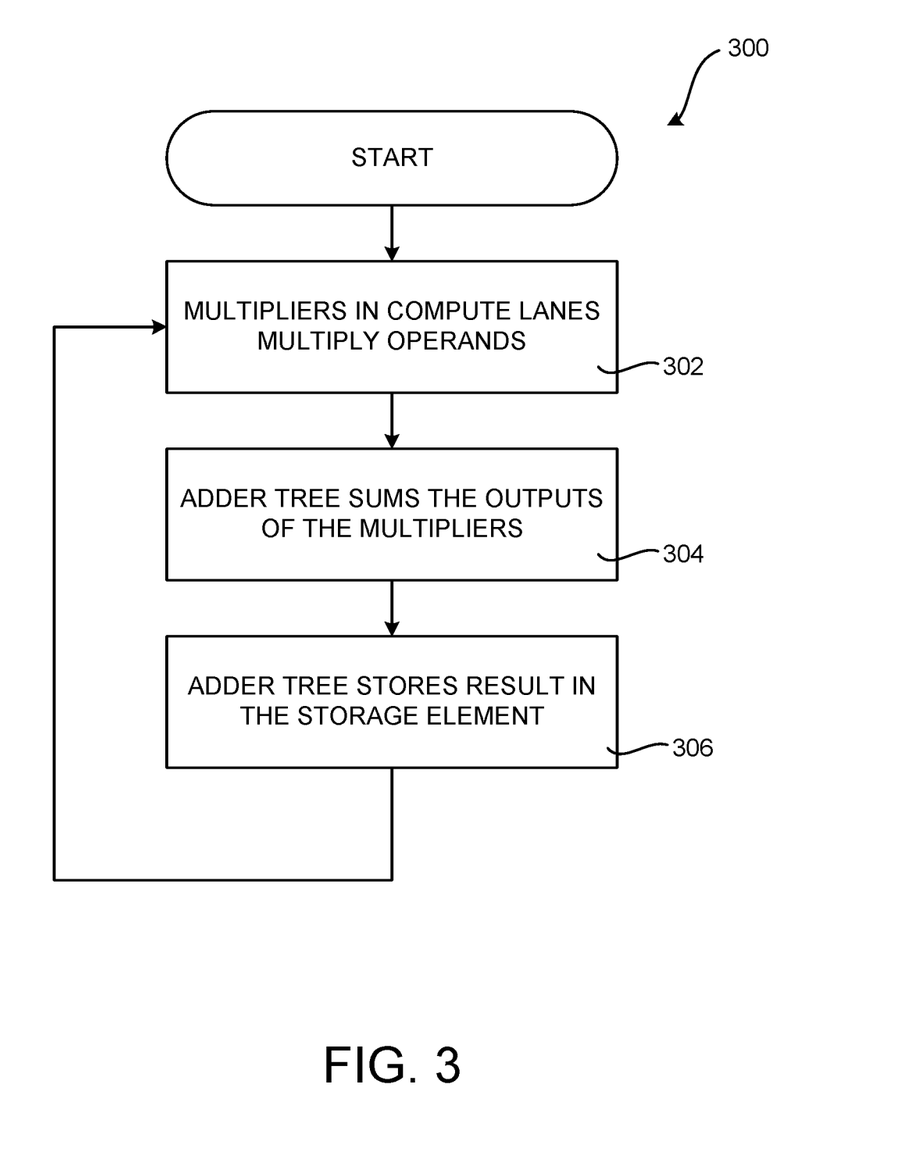
FIG. 3 is a flow diagram showing a routine that illustrates aspects of the operation of the operation of the neural processing element illustrated in FIG. 2, according to one embodiment disclosed herein.

FIG. 3 is a flow diagram showing a routine 300 that illustrates aspects of the operation of the neural processing element 105F configured with SIMD compute lanes described above with reference to FIGS. 1 and 2, according to one embodiment disclosed herein. It should be appreciated that the logical operations described herein with regard to FIG. 3, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300 begins at operation 302, where the multipliers 202 of an neural processing element 105F multiply the operands 204 and 206 in the manner described above with regard to FIG. 2. The 300 then proceeds from operation 302 to operation 304, where the adders 208 in the adder tree 210 sum the outputs of the multipliers 202 in the manner described above.

From operation 304, the routine 300 proceeds to operation 306, where the adder tree 210 stores the result of the summation in the storage element 212. The routine 300 then proceeds from operation 306 back to operation 302, where the process described above can be repeated for additional operands 204 and 206.

Figure 4:
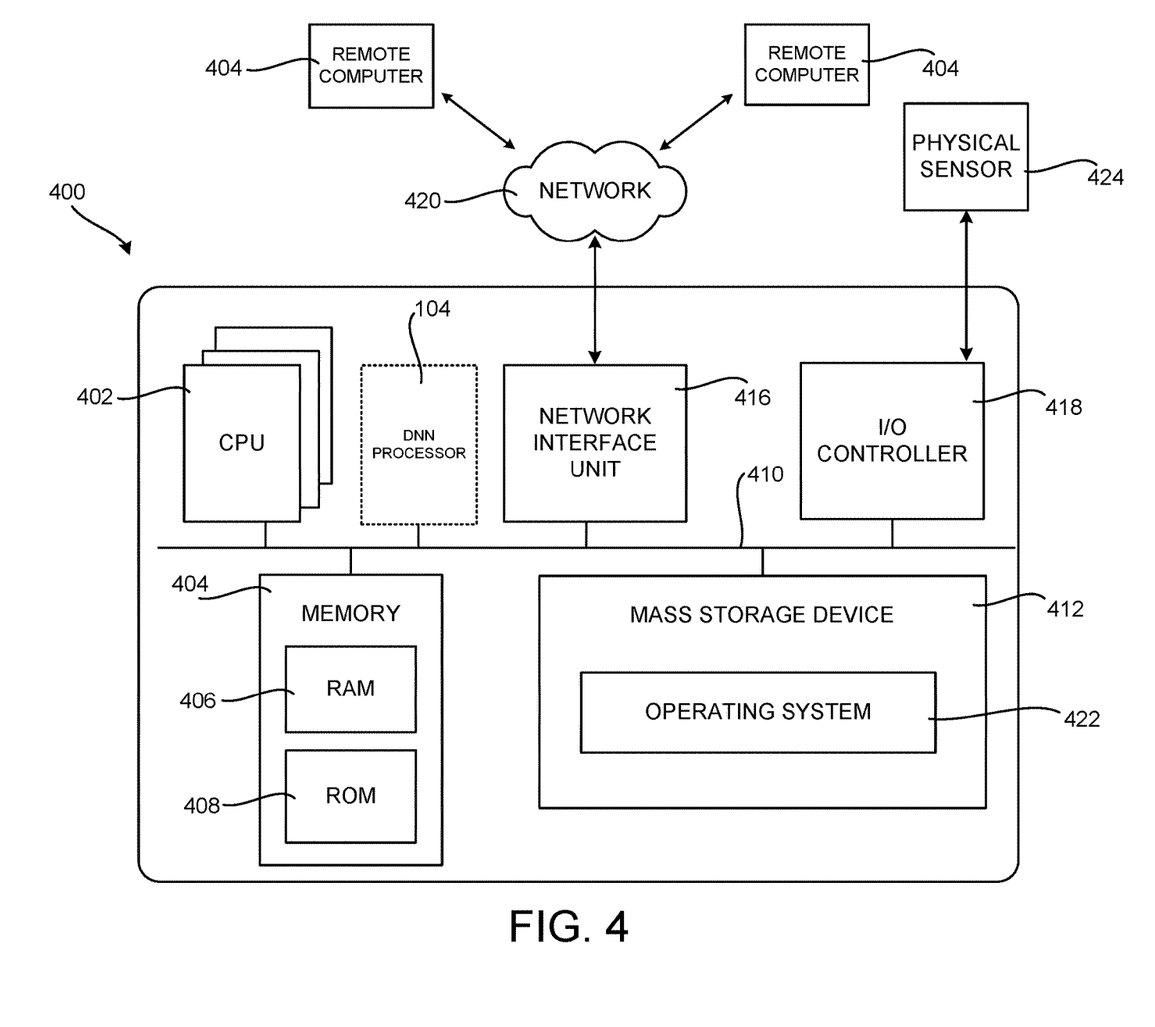
FIG. 4 is a computer architecture diagram showing an illustrative computer hardware and software architecture for a computing device that can act as an application host for a DNN processor that includes neural processing elements with SIMD compute lanes, according to one embodiment.

FIG. 4 is a computer architecture diagram showing an illustrative computer hardware and software architecture for a computing device that can act as an application host for the DNN processor 112 presented herein. In particular, the architecture illustrated in FIG. 4 can be utilized to implement a server computer, mobile phone, an e-reader, a smartphone, a desktop computer, an AR/VR device, a tablet computer, a laptop computer, or another type of computing device suitable for use with the DNN processor 112.

The computer 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, can be stored in the ROM 408. The computer 400 further includes a mass storage device 412 for storing an operating system 422, application programs, and other types of programs. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 420. The computer 400 can connect to the network 420 through a network interface unit 416 connected to the bus 410. It should be appreciated that the network interface unit 416 can also be utilized to connect to other types of networks and remote computer systems. The computer 400 can also include an input/output controller 418 for receiving and processing input from a number of other devices, including a keyboard, mouse, touch input, an electronic stylus (not shown in FIG. 4), or a physical sensor such as a video camera. Similarly, the input/output controller 418 can provide output to a display screen or other type of output device (also not shown in FIG. 4).

It should be appreciated that the software components described herein, when loaded into the CPU 402 and executed, can transform the CPU 402 and the overall computer 400 from a general-purpose computing device into a special-purpose computing device customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
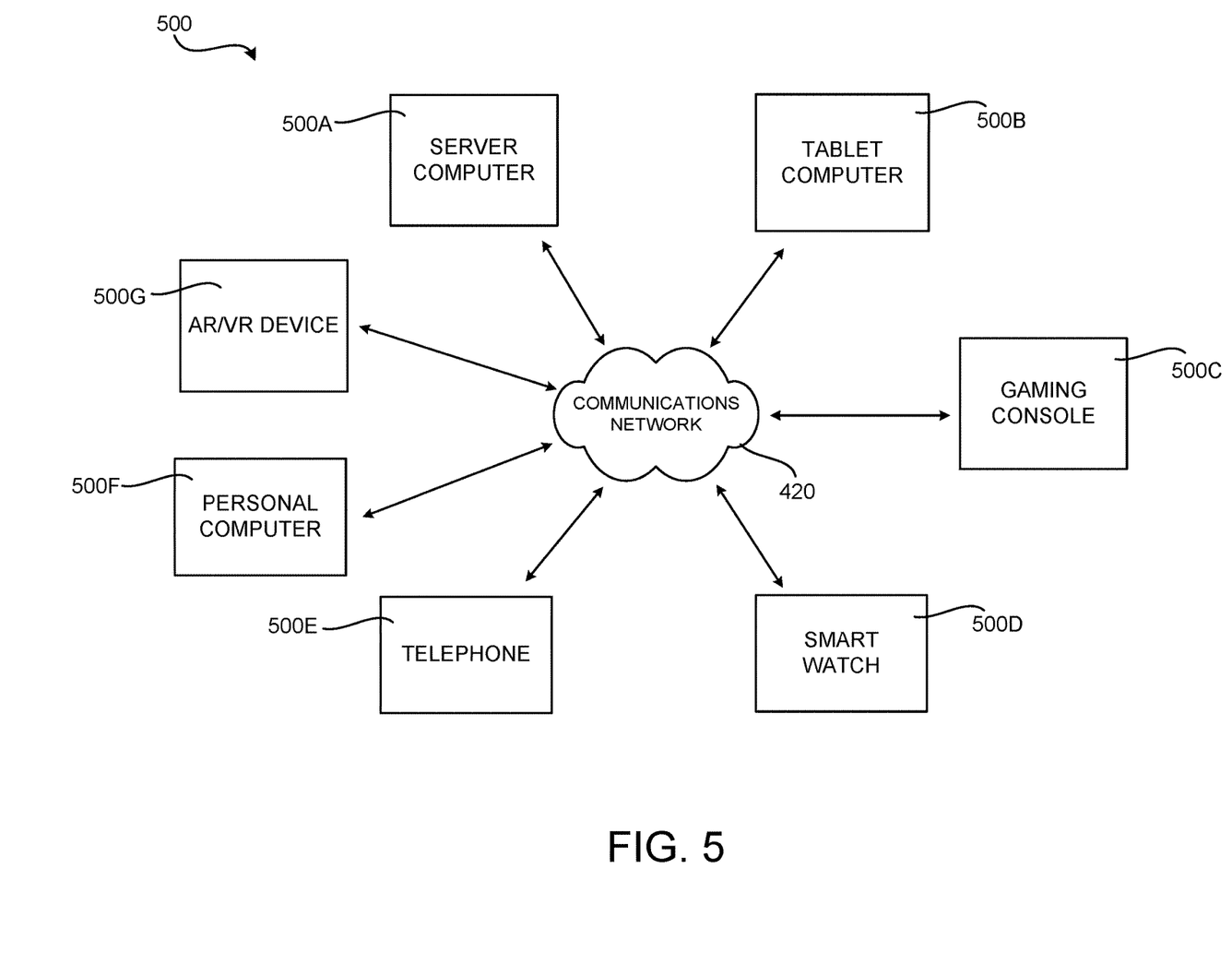
FIG. 5 is a network diagram illustrating a distributed computing environment in which aspects of the disclosed technologies can be implemented, according to various embodiments presented herein.

FIG. 5 is a network diagram illustrating a distributed network computing environment 500 in which aspects of the disclosed technologies can be implemented, according to various embodiments presented herein. As shown in FIG. 5, one or more server computers 500A can be interconnected via a communications network 420 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 500B, a gaming console 500C, a smart watch 500D, a telephone 500E, such as a smartphone, a personal computer 500F, and an AR/VR device 500G.

In a network environment in which the communications network 420 is the Internet, for example, the server computer 500A can be a dedicated server computer operable to process and communicate data to and from the client computing devices 500B-500G via any of a number of known protocols, such as, hypertext transfer protocol ("HTTP"), file transfer protocol ("FTP"), or simple object access protocol ("SOAP"). Additionally, the networked computing environment 500 can utilize various data security protocols such as secured socket layer ("SSL") or pretty good privacy ("PGP"). Each of the client computing devices 500B-500G can be equipped with an operating system operable to support one or more computing applications or terminal sessions such as a web browser (not shown in FIG. 5), or other graphical user interface (not shown in FIG. 5), or a mobile desktop environment (not shown in FIG. 5) to gain access to the server computer 500A.

The server computer 500A can be communicatively coupled to other computing environments (not shown in FIG. 5) and receive data regarding a participating user's interactions/resource network. In an illustrative operation, a user (not shown in FIG. 5) may interact with a computing application running on a client computing device 500B-500G to obtain desired data and/or perform other computing applications.

The data and/or computing applications may be stored on the server 500A, or servers 500A, and communicated to cooperating users through the client computing devices 500B-500G over an exemplary communications network 420. A participating user (not shown in FIG. 5) may request access to specific data and applications housed in whole or in part on the server computer 400A. These data may be communicated between the client computing devices 500B-500G and the server computer 500A for processing and storage.

The server computer 500A can host computing applications, processes and applets for the generation, authentication, encryption, and communication of data and applications, and may cooperate with other server computing environments (not shown in FIG. 5), third party service providers (not shown in FIG. 5), network attached storage ("NAS") and storage area networks ("SAN") to realize application/data transactions.

It should be appreciated that the computing architecture shown in FIG. 4 and the distributed network computing environment shown in FIG. 5 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A deep neural network (DNN) processor, comprising: an even number of hardware binary multipliers, each of the hardware binary multipliers configured to multiply a first operand with a second operand to generate a binary output, and a single hardware binary adder tree for summing binary outputs of the hardware binary multipliers.

Clause 2. The deep neural network processor of clause 1, further comprising a storage element for storing a binary output of the single hardware binary adder tree.

Clause 3. The deep neural network processor of any of clauses 1 or 2, wherein the first operand and the second operand comprise binary numbers having a number of bits equal to a power of two plus one.

Clause 4. The deep neural network processor of any of clauses 1-3, wherein the binary outputs of the hardware binary multipliers comprise 18-bit binary numbers.

Clause 5. The deep neural network processor of any of clauses 1-4, wherein a binary output of the single hardware binary adder tree comprises a 21-bit binary number.

Clause 6. The deep neural network processor of any of clauses 1-5, wherein the single hardware binary adder tree comprises an even number of first hardware binary adders for summing the binary outputs of the hardware binary multipliers.

Clause 7. The deep neural network processor of any of clauses 1-6, wherein outputs of the first hardware binary adders comprise 19-bit binary numbers.

Clause 8. The deep neural network processor of any of clauses 1-7, wherein the single hardware binary adder tree comprises an even number of second hardware binary adders for summing outputs of the first hardware binary adders.

Clause 9. The deep neural network processor of any of clauses 1-8, wherein outputs of the second hardware binary adders comprise 20-bit binary numbers.

Clause 10. The deep neural network processor of any of clauses 1-9, wherein the single hardware binary adder tree comprises a third hardware binary adder for summing outputs of the second hardware binary adders.

Clause 11. The deep neural network processor of any of clauses 1-10, wherein an output of the third hardware binary adder comprises a 21-bit binary number.

Clause 12. A processing system, comprising: a deep neural network (DNN) processor comprising at least one neural processing element, the at least one neural processing element comprising: eight hardware binary multipliers, each of the hardware binary multipliers configured to multiply a first operand with a second operand to generate a binary output, and a single hardware binary adder tree configured to sum binary outputs of the eight hardware binary multipliers Clause 13. The processing system of clause 12, wherein the first operand and the second operand comprise 9-bit binary numbers and wherein the binary outputs of the eight hardware binary multipliers comprise 18-bit binary numbers.

Clause 14. The processing system of any of clauses 12 or 13, wherein the single hardware binary adder tree comprises an even number of first hardware binary adders for summing the binary outputs of the eight hardware binary multipliers and wherein outputs of the first hardware binary adders comprise 19-bit binary numbers.

Clause 15. The processing system of any of clauses 12-14, wherein the single hardware binary adder tree further comprises an even number of second hardware binary adders for summing outputs of the first hardware binary adders and wherein outputs of the second hardware binary adders comprise 20-bit binary numbers.

Clause 16. The processing system of any of clauses 12-15, wherein the single hardware binary adder tree further comprises a third hardware binary adder for summing outputs of the second hardware binary adders and wherein an output of the third hardware binary adder comprises a 21-bit binary number.

Clause 17. The processing system of any of clauses 12-16, wherein the at least one neural processing element further comprises a storage element for storing the output of the third hardware binary adder.

Clause 18. A deep neural network (DNN) processor, comprising: a plurality of neural processing elements, each of the plurality of neural processing elements comprising an even number of hardware binary multipliers configured to multiply a first 9-bit binary operand with a second 9-bit binary operand to generate an 18-bit binary output, a single hardware binary adder tree configured to sum the 18-bit binary outputs of the hardware binary multipliers to generate a 21-bit binary output, and a storage element configured to store the 21-bit binary output of the single hardware binary adder tree.

Clause 19. The DNN processor of clause 18, wherein the single hardware binary adder tree comprises: four first hardware binary adders configured to sum the 18-bit binary outputs of the hardware binary multipliers; and two second hardware binary adders configured to sum binary outputs of the four first hardware binary adders.

Clause 20. The DNN processor of any of clauses 18 or 19, wherein the single hardware binary adder tree further comprises a third hardware binary adder configured to sum binary outputs of the two second hardware binary adders to generate the 21-bit binary output of the single hardware binary adder tree and to store the 21-bit binary output of the single hardware binary adder tree in the storage element.

Based on the foregoing, it should be appreciated that an neural processing element having SIMD compute lanes has been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A deep neural network (DNN) processor comprising a plurality of neuron processing elements implemented as ASICs configured to provide SIMD compute lanes, wherein each of the neuron processing elements are synchronized with each of the other neuron processing elements based on flow of kernel data within the DNN processor, the neuron processing elements comprising:
an even number of hardware binary multipliers, each of the hardware binary multipliers configured to multiply a first signed 8-bit operand with a second signed 8-bit operand to generate a 18-bit binary output, and
a single hardware binary adder tree for summing binary outputs of the hardware binary multipliers as follows:
process the 18-bit binary outputs to generate 19-bit values;
process the 19-bit values to generate 20-bit values;
process the 20-bit values to generate a 21-bit value; and
output the 21-bit value.

2. The deep neural network processor of claim 1, further comprising a storage element for storing a binary output of the single hardware binary adder tree.

3. The deep neural network processor of claim 1, wherein the first operand and the second operand comprise binary numbers having a number of bits equal to a power of two plus one.

4. The deep neural network processor of claim 1, wherein the binary outputs of the hardware binary multipliers comprise 18-bit binary numbers.

5. The deep neural network processor of claim 1, wherein a binary output of the single hardware binary adder tree comprises a 21-bit binary number.

6. The deep neural network processor of claim 1, wherein the single hardware binary adder tree comprises an even number of first hardware binary adders for summing the binary outputs of the hardware binary multipliers.

7. The deep neural network processor of claim 6, wherein outputs of the first hardware binary adders comprise 19-bit binary numbers.

8. The deep neural network processor of claim 6, wherein the single hardware binary adder tree comprises an even number of second hardware binary adders for summing outputs of the first hardware binary adders.

9. The deep neural network processor of claim 8, wherein outputs of the second hardware binary adders comprise 20-bit binary numbers.

10. The deep neural network processor of claim 8, wherein the single hardware binary adder tree comprises a third hardware binary adder for summing outputs of the second hardware binary adders.

11. The deep neural network processor of claim 10, wherein an output of the third hardware binary adder comprises a 21-bit binary number.

12. A processing system, comprising:
a deep neural network (DNN) processor comprising a plurality of neural processing elements implemented as ASICs configured to provide SIMD compute lanes, wherein each of the neural processing elements are synchronized with each of the other neuron processing elements based on flow of kernel data within the DNN processor, the neuron processing elements comprising:
eight hardware binary multipliers, each of the hardware binary multipliers configured to multiply a first signed 8-bit operand with a second signed 8-bit operand to generate a 18-bit binary output, and
a single hardware binary adder tree configured to sum binary outputs of the eight hardware binary multipliers as follows:
process the 18-bit binary outputs to generate 19-bit values;
process the 19-bit values to generate 20-bit values;
process the 20-bit values to generate a 21-bit value; and
output the 21-bit value.

13. The processing system of claim 12, wherein the first operand and the second operand comprise 9-bit binary numbers and wherein the binary outputs of the eight hardware binary multipliers comprise 18-bit binary numbers.

14. The processing system of claim 13, wherein the single hardware binary adder tree comprises an even number of first hardware binary adders for summing the binary outputs of the eight hardware binary multipliers and wherein outputs of the first hardware binary adders comprise 19-bit binary numbers.

15. The processing system of claim 14, wherein the single hardware binary adder tree further comprises an even number of second hardware binary adders for summing outputs of the first hardware binary adders and wherein outputs of the second hardware binary adders comprise 20-bit binary numbers.

16. The processing system of claim 15, wherein the single hardware binary adder tree further comprises a third hardware binary adder for summing outputs of the second hardware binary adders and wherein an output of the third hardware binary adder comprises a 21-bit binary number.

17. The processing system of claim 16, wherein the neural processing elements further comprises a storage element for storing the output of the third hardware binary adder.

18. A deep neural network (DNN) processor, comprising:
a plurality of neural processing elements implemented as ASICs configured to provide SIMD compute lanes, wherein each of the plurality of neural processing elements are synchronized with each of the other neuron processing elements based on flow of kernel data within the DNN processor, the neuron processing elements comprising an even number of hardware binary multipliers configured to multiply a first 9-bit binary operand with a second 9-bit binary operand to generate an 18-bit binary output, a single hardware binary adder tree configured to:
sum the 18-bit binary outputs of the hardware binary multipliers to generate 19-bit binary outputs,
sum the 19-bit outputs to generate 20-bit binary outputs;
sum the 20-bit outputs to generate a 21-bit binary output; and a storage element configured to store the 21-bit binary output of the single hardware binary adder tree.

19. The DNN processor of claim 18, wherein the single hardware binary adder tree comprises:

four first hardware binary adders configured to sum the 18-bit binary outputs of the hardware binary multipliers; and two second hardware binary adders configured to sum binary outputs of the four first hardware binary adders.

20. The DNN processor of claim 19, wherein the single hardware binary adder tree further comprises a third hardware binary adder configured to sum binary outputs of the two second hardware binary adders to generate the 21-bit binary output of the single hardware binary adder tree and to store the 21-bit binary output of the single hardware binary adder tree in the storage element.

* * * * *